Oct. 15, 1940.    J. ULANO    2,217,718
CAMERA DISSOLVE
Filed Nov. 28, 1938
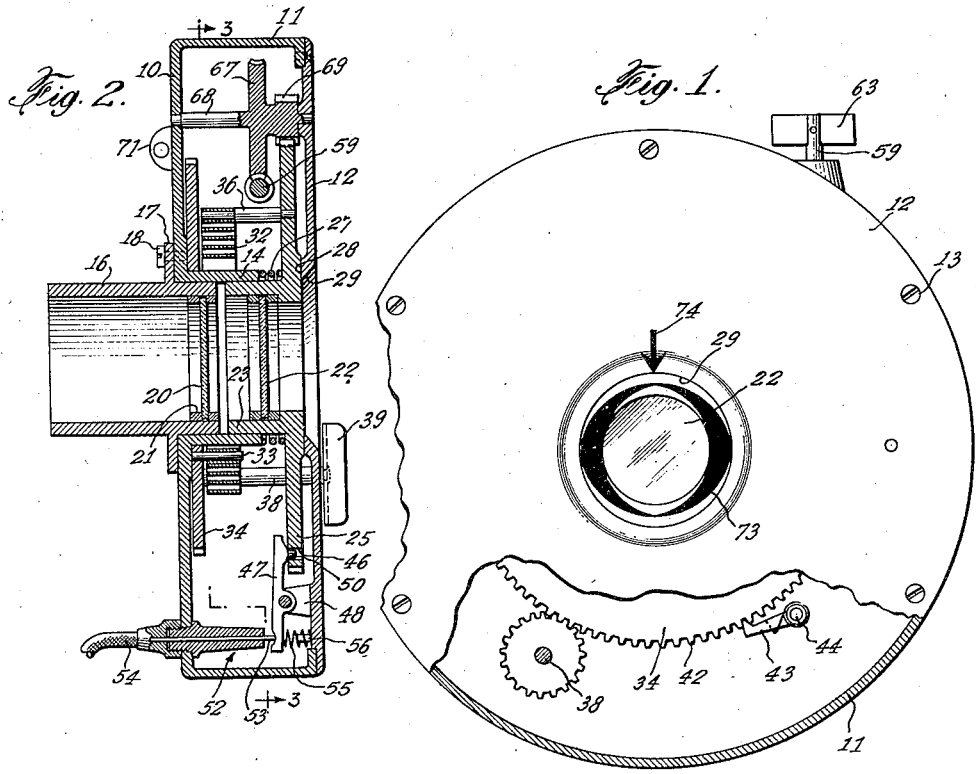
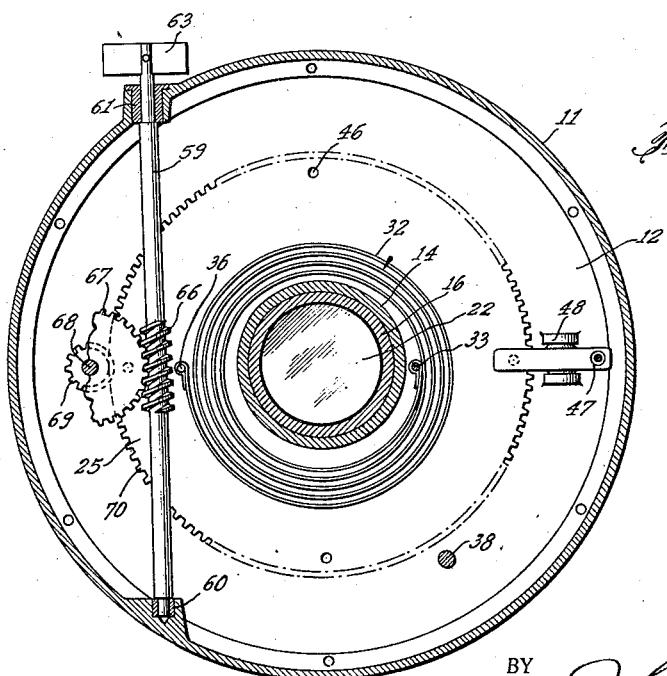
INVENTOR.
JOSEPH ULANO
BY John P. Chandler
his ATTORNEY.

Patented Oct. 15, 1940

2,217,718

UNITED STATES PATENT OFFICE 2,217,718

CAMERA DISSOLVE

Joseph Ulano, Brooklyn, N. Y.

Application November 28, 1938, Serial No. 242,821

4 Claims. (Cl. 88—16)

This invention relates to new and useful improvements in dissolving devices for motion picture cameras whereby the amount of light which is permitted to strike the lens is progressively decreased, thereby causing the image to fade out or to progressively increase the light, thereby causing the image to fade in. In use, a device of this type may be used to secure a complete fade out or fade in, or a so-called lap dissolve may be made wherein after the image has been made to fade out, the film may be rewound approximately the full length of the faded out portion, and such portion of the film again run through the camera while fading in the new image, thereby producing a lap dissolve.

Devices of this general character are well known in the motion picture art, but are, for the most part, quite complicated and are usually built into commercial motion picture cameras as an integral part thereof.

The principal object of the present invention is to provide a simple and relatively inexpensive apparatus which is a unit in itself and is adapted to be detachably secured to the lens portion of a conventional amateur or commercial motion picture camera.

Another object of the invention is to provide a dissolve device for motion picture cameras wherein the interval of time during which the fade-out or dissolve occurs is variable and wherein the device may be successively operated, when and as desired.

The preferred embodiment of the present invention includes a fixed and rotatable polarizing element through which the transmission of light can be selectively and progressively increased or decreased. The support for these elements is adapted to be detachably mounted on the front of the lens and a rotatable element revolved through successive arcs of 90°, either through some source of power or it may be manipulated by hand.

In the drawing:

Fig. 1 is a front elevation, partly broken away, of the preferred embodiment of the present invention;

Fig. 2 is a horizontal section taken through the center of the device;

Fig. 3 is a vertical section taken on line 3—3 of Fig. 2.

The embodiment of the invention illustrated in Figs. 1, 2 and 3, includes a casing which houses the operative parts of the mechanism, said casing comprising a circular rear wall 10, an annular side wall 11 integrally formed therewith, and a circular front wall 12 secured to the annular side wall by means of screws 13. The rear wall 10 is centrally apertured and is further provided with a central, internally disposed, annular flange portion or collar 14, which may be formed integrally with such rear wall. A cylindrical member 16 is fitted within this annular flange, such member also having an external annular flange 17 which is secured to the rear of the rear wall 10 by means of screws 18. The rear end of the cylindrical member 16 is adapted to fit within the lens opening of the camera or to enclose such lens, depending upon the construction of the camera.

At the forward end of this member a disc of light polarizing material 20 is positioned and supported therein by means of close fitting gaskets 21. This disc of polarized glass is fixed or stationary and another disc 22 of polarized glass is rotatable and is mounted within the cylindrical portion 23 of a rotatable disc or support 25. This cylindrical portion 23 is journaled within the forward end of the annular flange portion or collar 14, and a coil spring 27 positioned between the forward end of the collar 14 and the rear surface of the rotatable member 25 keeps such rotatable member in substantially firm engagement with a bearing portion 28 of the front wall 12. An aperture 29 is formed in the center of this front wall, and it will accordingly be apparent that light may pass through such aperture 29 and through the two discs of polarizing material 20 and 22.

As is well known in the art, two discs of light polarizing material may be rotated relative to each other to a point wherein the maximum amount of light will pass therethrough. One disc may then be rotated, while the other is fixed, through an arc of 90° and at this point substantially no light may pass therethrough, and during such rotation the amount of light progressively decreases. Accordingly, means are provided in the present device for rotating the second polarized disc 22 through angles of 90° at the will of the operator to increase and decrease the amount of such light passing through the same. Rotation is caused by means of a clock-type spring 32, the inner end of which is secured to a pin 33 mounted on a second rotatable disc 34. The outer end of the spring is secured to a pin 36 mounted on the rear surface of the rotatable disc 25. The spring is wound by means of a shaft 38 having a thumb turn 39 at the forward end thereof, such shaft projecting through a suitable aperture in the front plate 12. A gear 41 is keyed to the shaft 38, such gear engaging teeth 42 formed about the periphery of the rotatable disc 34. Backward movement of the rotatable disc 34 is prevented by means of a spring-pressed pawl 43 mounted on a shaft 44, which pawl becomes disengaged from the teeth while the spring is being wound.

The following means are provided for controlling rotation of the disc 25 while actuated by the spring to cause such disc to successively revolve through arcs of 90°. The disc 25 is provided with four equally spaced apertures 46 adjacent to the periphery thereof and a pivoted stop member 47 is mounted on a boss 48 secured at the rear of the front plate 12. A pin 50 is formed at one end of the stop member, such pin being positioned in one of the apertures 46 at all times except during rotative movement of such disc. The stop member 47 is actuated by means of a cable release structure 52, such structure having a flexible cable 53 which passes through a flexible tube 54 and which is actuated by the operator, all in a manner well known. When the operator depresses a finger piece (not shown) associated with the cable, the forward end thereof engages the rear end of the stop member 47, causing such end to move against the compression of a spring 55 mounted on a pin 56, thereby also causing the pin 52 to leave the aperture 46 and permit rotative movement of the disc 25.

After the pin 50 has released the disc, the cable is itself released by the operator and accordingly the pin is in spring pressed engagement with the rear face of the rotatable disc 25 during its rotatable movement. Accordingly, when the disc 25 is moved through an arc of 90°, its further rotative movement is stopped by means of the pin entering the next successive aperture 46.

In order to provide means for varying the speed of rotation and for controlling such speed, a shaft 59 is journalled at its lower end in the annular side wall 11, as shown at 60, and is journalled at its upper end at 61. At the upper end of the shaft a flat propeller 63 is secured and the dimensions of such propeller may be varied depending upon the speed of rotation which is desired. Substantially intermediate between the ends of the shaft 59 is a worm gear portion 66 which is engaged by the teeth of a gear 67 mounted on a horizontal shaft 68. This shaft is further provided with a smaller gear 69 which engages the toothed portions 70 formed about the periphery of the rotatable member 25.

By providing a spring of sufficient capacity, the rotatable polarized element may pass through a plurality of cycles from light to dark and vice versa before the spring need be rewound. In order to indicate to the operator whether the rotatable member is full dark or full light, the exposed surface of the rotatable disc is provided with two quarter-moon shaped markings 73, and the front wall 12 of the case has a marking 74 thereon in the shape of an arrow. Thus, when the arrow points to the narrow portion of the marking 73, the polarized element is in the full light position.

The casing may be mounted on the camera with the central opening therein in alignment with the lens. Any suitable means may be employed for such mounting and, if desired, it may be pivotally mounted in one side only in order that the casing may be swung away from the lens when not in use. This may be accomplished by providing a plurality of vertically aligned lugs 71 (Fig. 2) on the rear of the casing through which a vertical shaft (not shown) mounted on the camera, to one side of the lens, passes.

It will be appreciated that the illustrated means for actuating the polarized element in the case of the first embodiment and the screen in the case of the second is illustrative only, since any other suitable means could be employed, including means for hand operation, and without any spring or other motor.

What I claim is:

1. In a dissolving apparatus, the combination of a casing having aligned apertures in opposite walls thereof, a fixed polarizing element mounted within said casing and a second polarizing element rotatably mounted therein, and means for successively causing the second element to rotate through arcs of 90°, said means comprising a spring motor positioned within the casing gears connecting the motor and the rotatable element, a spring pressed starting and stopping element for such rotatable element, and a cable release for actuating the starting and stopping element.

2. A device of the class described comprising, in combination, a fixed polarizing element, means for supporting such element adjacent to and in optical alignment with the lens of a motion picture camera, a rotatable polarizing element, means for supporting said element in optical alignment with the first mentioned polarizing element, and means for successively rotating such second element through arcs of 90°, whereby the amount of light passing from the image to be photographed to the lens may be progressively increased or decreased, said latter means including a spring mounted concentrically of the polarizing elements, one end of the spring being connected with the supporting means for the fixed polarizing element and the opposite end of the spring being connected with the supporting means for the rotatable polarizing element.

3. A device of the class described comprising, in combination, a fixed polarizing element, means for supporting such element adjacent to and in optical alignment with the lens of a motion picture camera, a rotatable polarizing element, means for supporting said element in optical alignment with the first mentioned polarizing element, and means for successively rotating such second element through arcs of 90°, said means comprising a prime mover operatively connected with the support for the rotatable polarizing element, starting and stopping means for the prime mover and means for controlling the speed of operation thereof.

4. A device of the class described comprising, in combination, a fixed polarizing element, means for supporting such element adjacent to and in optical alignment with the lens of a motion picture camera, a rotatable polarizing element, means for supporting said element in optical alignment with the first mentioned polarizing element, and means for successively rotating such second element through arcs of 90° including a spring motor, starting and stopping means therefor and a governor for controlling the speed of the motor.

JOSEPH ULANO.